United States Patent [19]
Hino et al.

[11] Patent Number: 5,117,468
[45] Date of Patent: May 26, 1992

[54] IMAGE PROCESSING SYSTEM CAPABLE OF CARRYING OUT LOCAL PROCESSING FOR IMAGE AT HIGH SPEED

[75] Inventors: Masatoshi Hino, Zama; Kouji Fukuda, Kawasaki; Tetsuo Machida, Tokyo, all of Japan

[73] Assignee: Hitachi, Ltd., Tokyo, Japan

[21] Appl. No.: 486,436

[22] Filed: Feb. 28, 1990

[30] Foreign Application Priority Data

Mar. 3, 1989 [JP] Japan ................. 1-49826

[51] Int. Cl.⁵ ............................................. G06K 9/36
[52] U.S. Cl. ............................................. 382/41; 382/49
[58] Field of Search .......................... 382/41, 49, 27

[56] References Cited

U.S. PATENT DOCUMENTS

| | | | |
|---|---|---|---|
| 4,363,104 | 12/1982 | Nussmeier | 382/41 |
| 4,484,349 | 11/1984 | McCubbrey | 382/41 |
| 4,550,437 | 10/1985 | Kobayashi et al. | 382/41 |
| 4,710,965 | 12/1987 | Kobayashi | 382/49 |

Primary Examiner—Leo H. Boudreau
Assistant Examiner—David Fox
Attorney, Agent, or Firm—Antonelli, Terry, Stout & Kraus

[57] ABSTRACT

An image processing system for extracting a plurality of local images each composed of m×n pixels, successively from a two-dimensional original image, to process the extracted local images and to convert the original imae into a second image composed of modified pixel data corresponding to the local images is disclosed which system includes a plurality of local image extracting circuits for temporarily storing time-sequentially applied pixel data in each local image extracting circuit while shifting the storage position thereof, to deliver m×n pixels having a predetermined positional relation on the original image, from each local image extracting circuit in parallel, a first data transfer circuit for allotting pixels extracted successively from the original image, to the local image extracting circuits, a local image reconstruction circuit for combining a plurality of pixels from the local image extracting circuits to reconstruct a plurality of local images deviated from each other by one pixel on the original image and to deliver the local images in parallel, a local image processing circuit for processing the local images from the local image reconstruction circuit in parallel, to convert the local images into a plurality of modified pixel data for forming the second image, and a second data transfer circuit for transferring the modified pixel data to an image memory.

16 Claims, 9 Drawing Sheets

FIG. 9

| COUNTER VALUE | STORING POSITION OF PIXELS | |
|---|---|---|
| | OUTPUT OF CIRCUIT 50A | OUTPUT OF CIRCUIT 50B |
| 0 | 0 | 1 |
| 1 | 2 | 3 |
| 2 | 4 | 5 |
| ... | ... | ... |
| 15 | 30 | 31 |

| COUNTER VALUE | BUFFER MEMORY | INPUT PIXELS | |
|---|---|---|---|
| | | CIRCUIT:A | CIRCUIT:B |
| 0 | 31A | 0 | 1 |
| 1 | | 2 | 3 |
| 2 | | 4 | 5 |
| .... | | .... | .... |
| 15 | | 30 | 31 |
| 16 | 31B | 0 | 1 |
| 17 | | 2 | 3 |
| 18 | | 4 | 5 |
| ..... | | ..... | ..... |
| 31 | | 30 | 31 |

102    31    40

IMAGE PROCESSING SYSTEM CAPABLE OF CARRYING OUT LOCAL PROCESSING FOR IMAGE AT HIGH SPEED

BACKGROUND OF THE INVENTION

1. Field of the Invention

The present invention relates to image processing systems, and more particularly to an image processing system capable of carrying out local processing for an image at high speed.

2. Description of the Prior Art

According to a fundamental method for processing a local region on an image, as disclosed in, for example, the Unger U.S. Pat. No. 3,106,698, a plurality of processors for carrying out local processing are arranged for predetermined local regions, to carryout parallel processing for the local regions. Further, according to another method, in order to extract a local region composed of $m \times n$ pixels from an image, a shift register with a storage capacity corresponding to $(m-1)$ rows of the image is connected in cascade with another shift register corresponding to n pixels, and image data is supplied to the cascade-connected shift registers in a scanning order bit by bit. Then, image data is delivered from $m \times n$ bits of the shift registers which bits have a predetermined positional relation, in parallel. That is, a local region composed of $m \times n$ pixels is extracted from the image. A plurality of local images thus obtained are successively processed by a local image processor.

The processing speed of image processing according to the latter method can be increased by dividing the image data into two parts in a vertical direction (namely, sub-scanning direction) and by operating two process corresponding to the above parts in parallel. Further, as described in the Sternberg U.S. Pat. No. 4,174,514 image data is divided into a plurality of parts in a horizontal direction (namely, main scanning direction) and parallel processing is carried out for the above parts.

The latter method, in which an image to be processed is divided into a plurality of parts in a vertical or horizontal direction, and local images are processed in parallel in respective parts, is not effective for increasing the speed of image processing in a system for transmitting image data in a scanning order bit by bit, such as a facsimile system. Further, let us consider a case where image data is stored in a one-dimensional memory, by way of example. Usually, rows in a two-dimensional image are successively read out from top to bottom, and image data in the read-out rows is arranged in succession, to form one-dimensional image data, which is stored in the one-dimensional memory. In this case, a single memory access can refer to only data indicative of a plurality of consecutive pixels in the same row, or only the above data can be written in a processing circuit by a single memory access. That is, in order to refer to image data in k regions, or to write the above image data in processing circuits, it is necessary to make k memory accesses. In this case, where the speed of access to the memory is higher than the processing speed for a local region, there arises no problem. However, when the access speed is slower than the processing speed, the effect of parallel processing for a plurality of regions will be reduced by slow memory access. Further, according to this method, it is required to provide a plurality of means for accessing original image data, for example, direct memory access controllers (DMAC's), the number of which is equal to the number of parallel processing systems. Accordingly, the hardware used is complicated, and large in size.

Further, according to the former method, in which a plurality of processors are arranged for predetermined local regions, image processing can be carried out at high speed, but an apparatus for image processing is very large in scale. Further, in order to supply data to a plurality of processors at the same time, it is necessary to read out data from a plurality of positions on an original image at the same time. Accordingly, an image memory is required to have a special structure.

SUMMARY OF THE INVENTION

It is an object of the present invention to provide an image processing system which can process a plurality of local images in parallel without dividing image data into a plurality of parts.

In order to attain the above object, the present invention uses a circuit arrangement proposed by the present inventors in JP-A-63-128,482. This circuit arrangement includes a plurality of local image extracting circuits for extracting a plurality of pixel data having a predetermined positional relation on a two-dimensional original image, from image data time-sequentially inputted to each local image extracting circuit, to deliver the pixel data from each local image extracting circuit in parallel, local image reconstruction means for combining a plurality of pixel data from the local image extracting circuits so as to reconstruct a plurality of local images which deviate from each other on the original image by a predetermined amount, and a plurality of local image processing circuits for processing the local images from the local image reconstruction means in parallel, to deliver a plurality of modified pixel data corresponding to the local images.

An image processing system according to the present invention comprises in addition to the above circuit arrangement, first memory means for storing therein two-dimensional image data (that is, original image data) to be processed, second memory means for storing therein image data which has been subjected to image processing, first image data transfer means for allotting image data which is read out from the first memory means in a predetermined scanning order, to the local image extracting circuits in a predetermined order, and second image data transfer means for writing pixel data which is delivered from the local image processing circuits in parallel, in the second memory means in a predetermined order.

The local image extracting circuits, the local image reconstruction means, the local image processing circuits, and the first and second image data transfer means are incorporated in, for example, a single image processor, which is connected to the common bus of an image processing system including a conventional image display device, an image input device, an image memory, and a control processor. The first image data transfer means includes, for example, a direct memory access controller (DMAC), to fetch original image data stored in that area of the image memory (the first memory means) which is specified by the control processor into a buffer memory. The image data is then supplied from the buffer memory to the local image extracting circuits.

Like the first image data transfer means, the second image data transfer means includes a DMAC and a buffer memory, to transfer pixel data which is delivered from the local image processing circuits, to the second memory means through the buffer memory.

According to the present invention, original image data is successively read out from the first memory means in accordance with a predetermined scanning direction, and then allotted to a plurality of local image extracting circuits bit by bit in a predetermined order. Each of the local image extracting circuits includes a plurality of shift registers corresponding to the size of a local image to be extracted, to deliver m×n pixel data in parallel. Pixel data from the first memory means is supplied to each of the local image extracting circuits at an interval corresponding to the number of parallel-connected local image extracting circuits. Thus, m×n pixel data delivered from each local image extracting circuit is not always adjacent to each other on an original image. The local image reconstruction means combines pixel data from the local image extracting circuits, to form a plurality of local images, each of which includes m×n pixel data adjacent to each other on the original image. The local images thus obtained deviate from each other on the original image by a predetermined amount, and a plurality of local image processing circuits carry out parallel processing for the local images. Thus, image processing can be carried out at a very high speed.

The foregoing and other objects, advantages, manner of operation and novel features of the present invention will be understood from the following detailed description when read in connection with the accompanying drawings.

BRIEF DESCRIPTION OF THE DRAWINGS

FIGS. 8 and 9 are tables for explaining the operation of the circuit part of FIG. 7.

DESCRIPTION OF THE PREFERRED EMBODIMENTS

Now, embodiment of the present invention will be explained below, with reference to the drawings.

Figure 1:
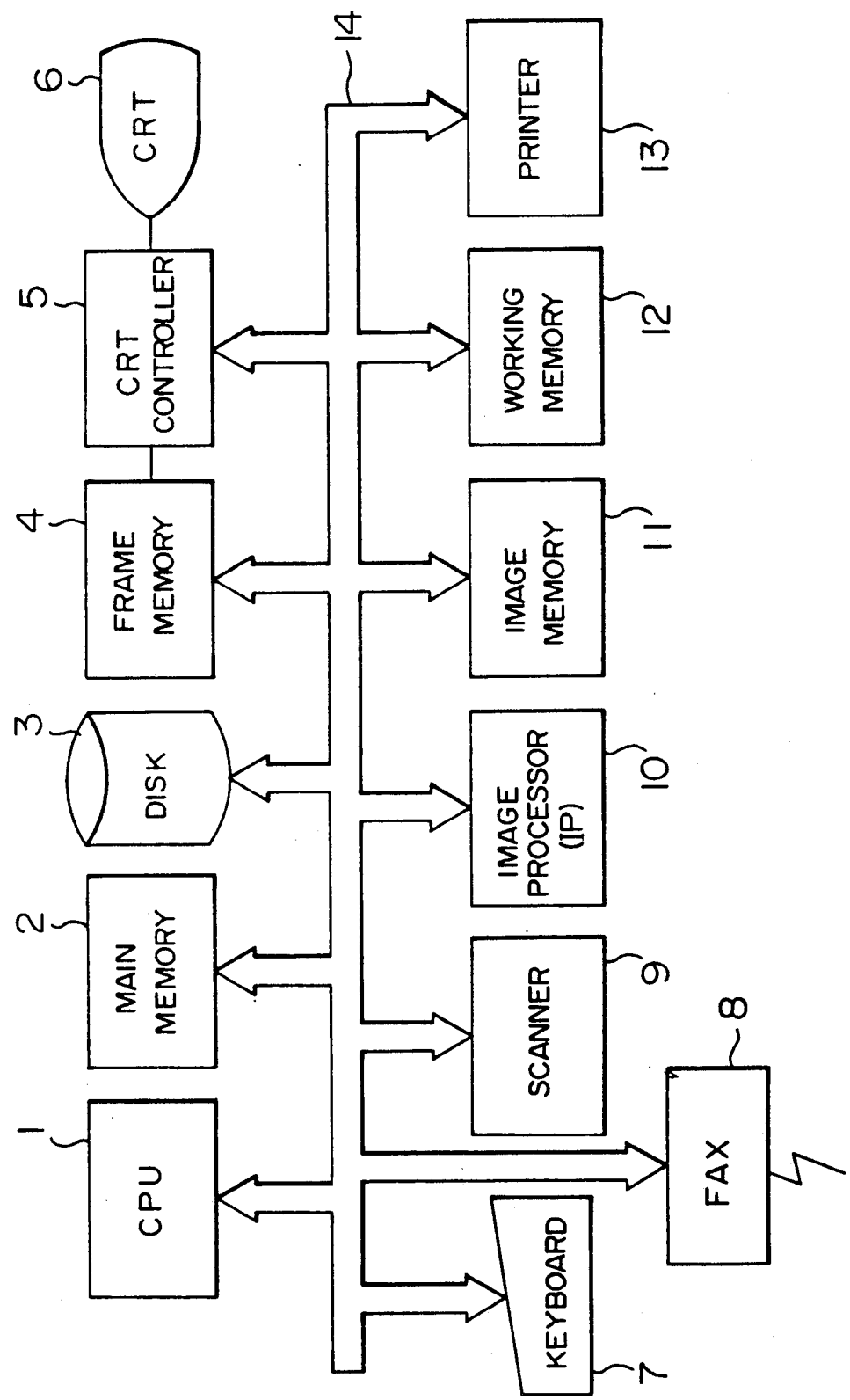
FIG. 1 is a block diagram showing the whole construction of an embodiment of an image processing system according to the present invention.

FIG. 1 is a block diagram showing the overall construction of an embodiment of an image processing system according to the present invention. In FIG. 1, reference numeral 1 designates a control processor CPU for controlling the whole of the image processing system, 2 a main memory for storing programs to be executed by the CPU 1, and for storing operation parameters which are used by the CPU 1, and 3 a disk device for storing programs, image data and document data. Although a single disk device is shown in FIG. 1, the disk device 3 includes several kinds of disk device used in accordance with the properties of data, for example, magnetic disk devices (including a hard disk device and a floppy disk device) and an optical disk device. Further, in FIG. 1, reference numeral 4 designates a frame memory for writing therein information which is to be supplied to a CRT device 6, 5 a CRT controller for supplying the contents of the frame memory 4 to the CRT device 6, 7 a keyboard for inputting code data and commands for the CPU 1, 8 a facsimile device for sending image data to and receiving image data from an external system which is connected to the present image processing system through a communication line, 9 a scanner for supplying image data to the image memory 11, 10 an image processor which will be explained later in detail, 11 an image memory for temporarily storing image data, 12 a working memory, and 13 a printer for outputting image data and document data.

Figure 2:
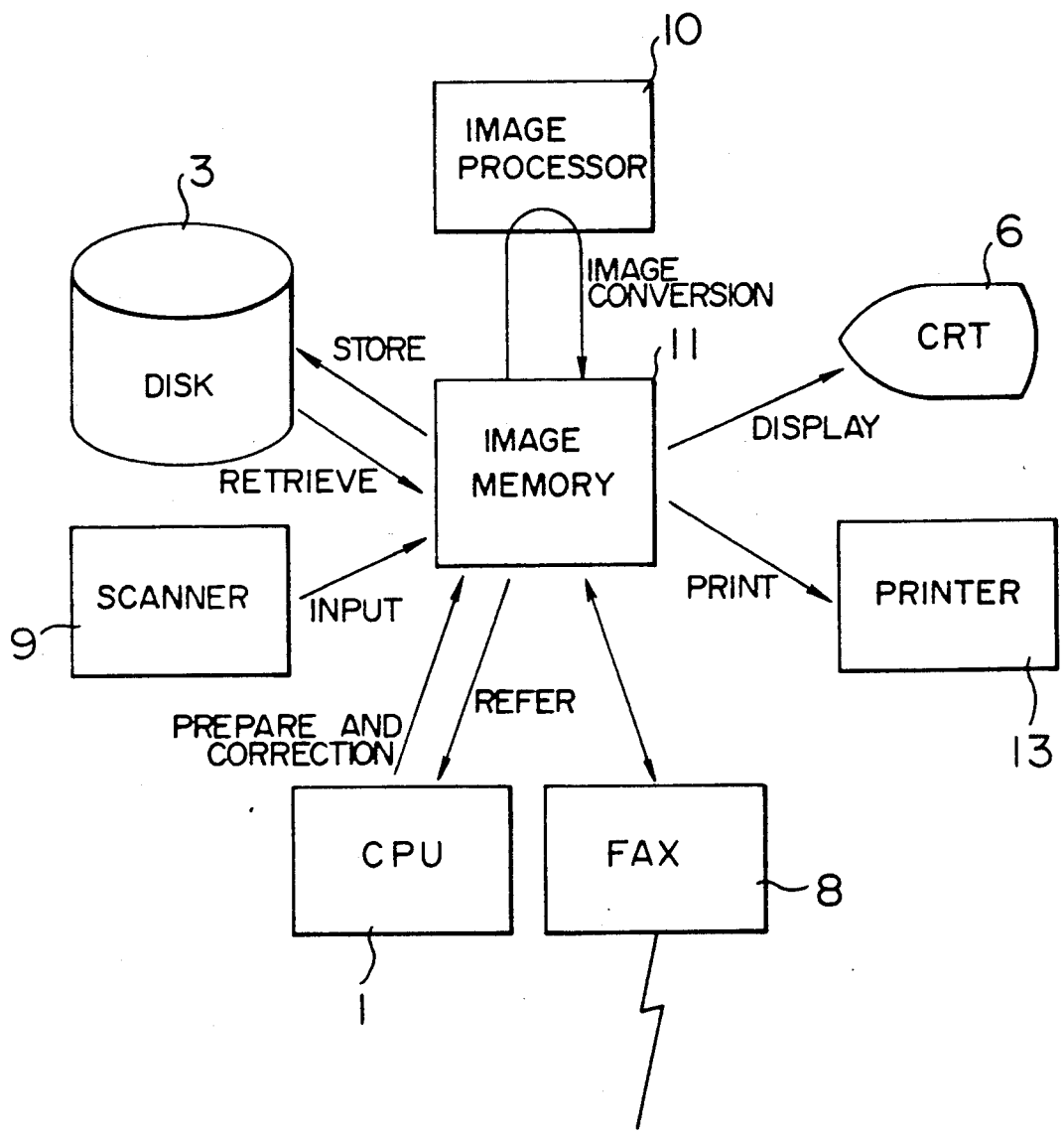
FIG. 2 is a block diagram for explaining the image processing function of the embodiment of FIG. 1.

FIG. 2 is a block diagram showing main functions of the present embodiment Referring to FIG. 2, image data is given by, for example, the scanner 9 or the facsimile device 8, to be written in the image memory 11. The CPU 1 refers to or modifies the image data written in the image memory 11. Further, the image data stored in the image memory 11 is subjected to image conversion by the image processor 10, outputting to the CRT 6 through the frame memory 4, outputting to the printer 13 or the facsimile device 8, or storing in the disk device 3 in accordance with a command from the CPU 1. Further, images stored in the disk device 3 are retrieved, to send a desired image to the image memory 11.

Figure 3A:
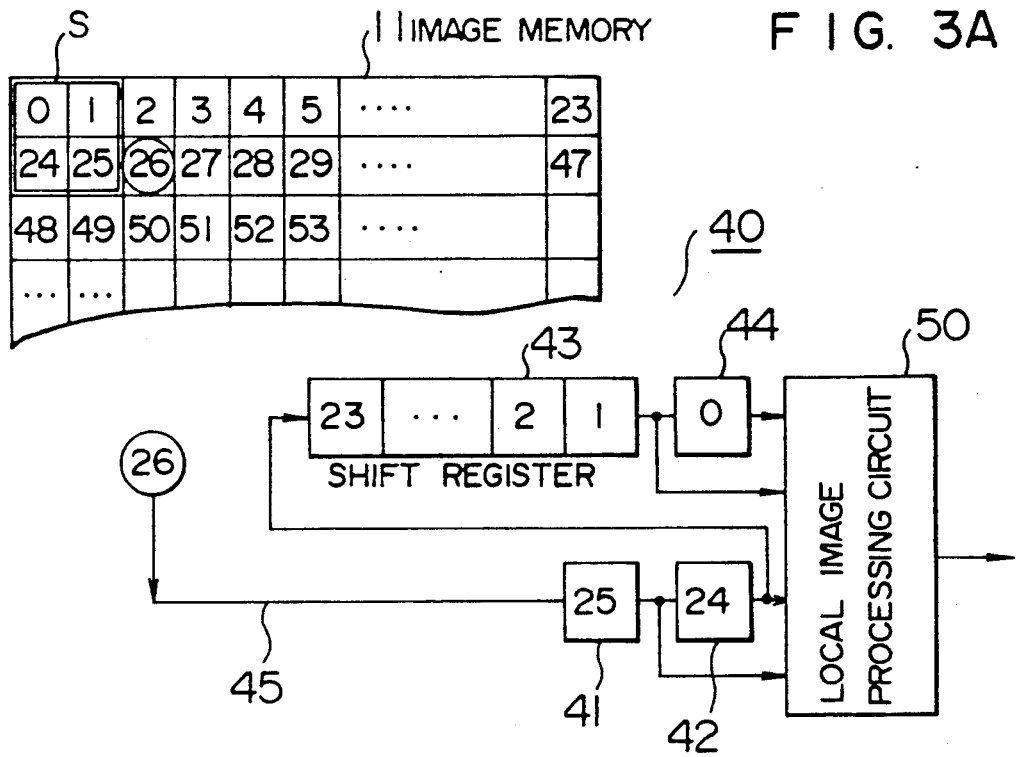
FIG. 3A and 3B are diagrams for explaining the fundamental construction and operation of an image processor.
Figure 3B:
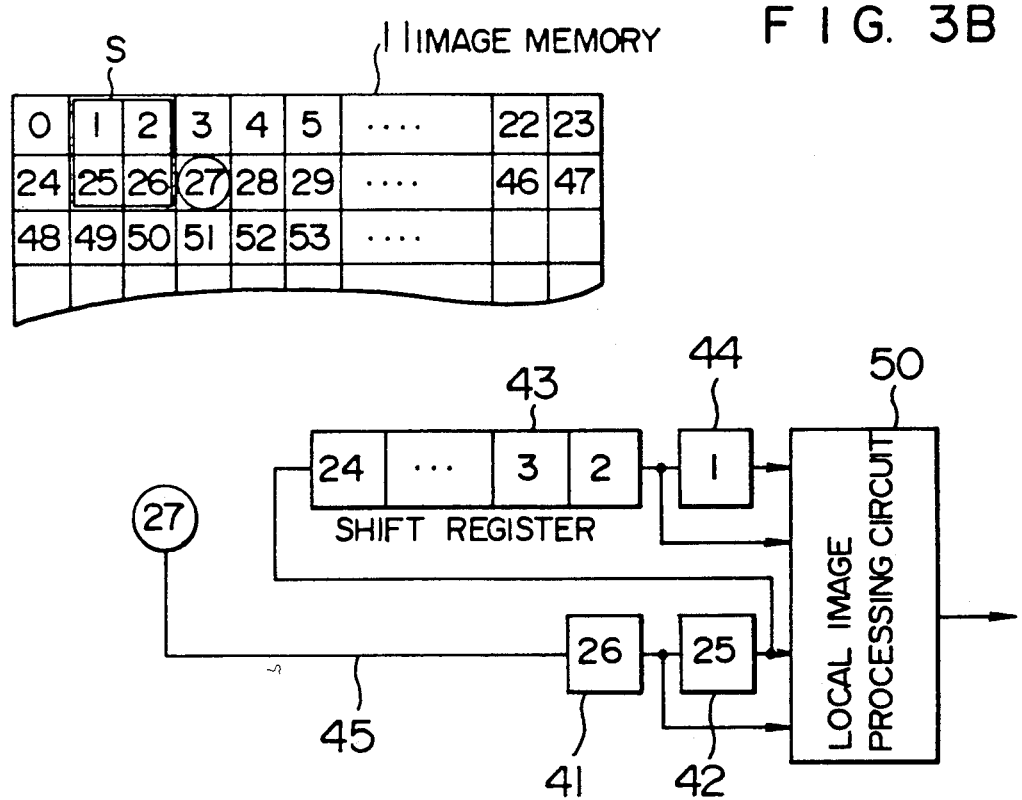

FIGS. 3A and 3B are diagrams for explaining the fundamental construction and operation of an image processor. As shown in FIG. 3A, the image processor includes a local image extracting circuit 40 and a local image processing circuit 50. An example of the local image extracting circuit 40, as shown in FIG. 3A, includes cascade-connected shift registers 41 to 44. In this example, a local region S made up of 2×2 pixels which are adjacent to each other, can be extracted from the two-dimensional image (that is, original image) stored in the image memory 11. Original image data which is read out from the image memory 11 along each row of the original image, is successively sent to the shift registers 41 and 42 through an input line 45. Each of the shift registers 41 and 42 can store therein image data of one pixel. The output of the shift register 42 is applied to the shift register 43 having a storage capacity of a plurality of pixels, and is then applied to the shift register 44 having a storage capacity of one pixel. The number of bits included in the shift register 43 is determined so that one row on the original image can be stored in the shift registers 43 and 44. Accordingly, when the input line 45 is supplied with, for example, the contents of the twenty-sixth pixel as shown in FIG. 3A, the shift registers 41, 42 and 44 and the rightmost bit of the shift register 43 can indicate the states of 2×2 pixels which are adjacent to each other on the original image, that is, the state of the local region S made up of four pixels. By taking out the outputs of the shift registers 41 to 44 in parallel, image data in the local region S can be supplied to the local image processing circuit 50. FIG. 3B shows the states of the shift registers 41 to 44 at a time the input line 45 receives the contents of the twenty-seventh pixel. At this time, a local region is extracted which is deviated from the local region of FIG. 3A by one pixel in the row direction. In other words, the local image extracting circuit 40 scans the original image with a window equal in size to $2 \times 2$ pixels, in synchronism with a reading operation for reading out image data from the image memory 11 bit by bit, and local images specified by the window are successively supplied to the local image processing circuit 50. It can be easily assumed that if an increased number m of shift registers are arranged in a row direction and increased number n of outputs are taken out from each shift register, local regions of an arbitrary size can be formed which include $m \times n$ pixels.

Figure 4A:
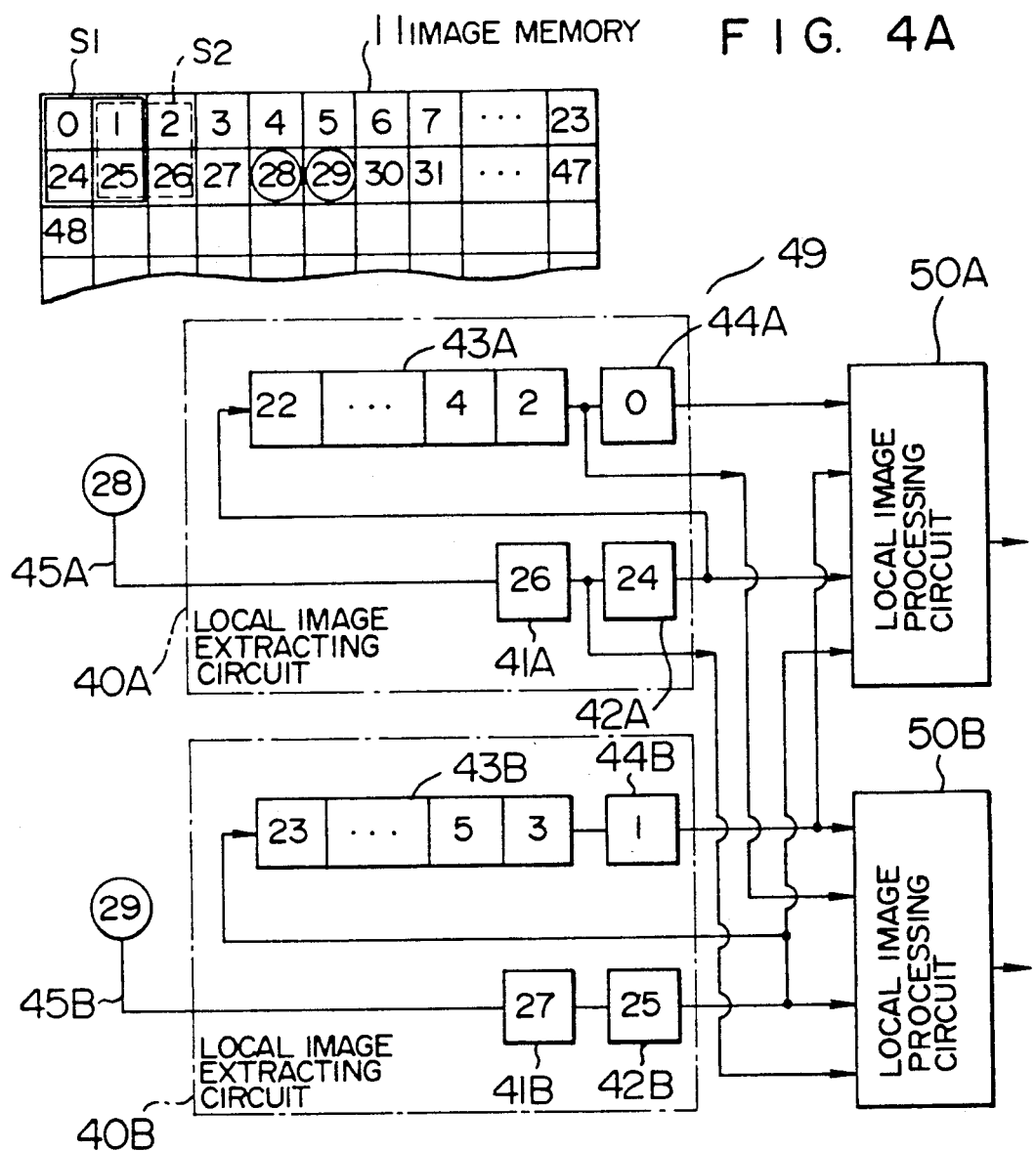
FIGS. 4A and 4B are diagrams for explaining the fundamental construction and operation of an example of a high-speed image processor according to the present invention.

FIG. 4A shows the fundamental structure and operation of an example of a high-speed image processor according to the present invention. In an image processor according to the present invention, a plurality of local image extracting circuits are operated in parallel, and the outputs of the local image extracting circuits are supplied to a plurality of local image processing circuits through a local image reconstruction circuit 49.

Figure 4B:
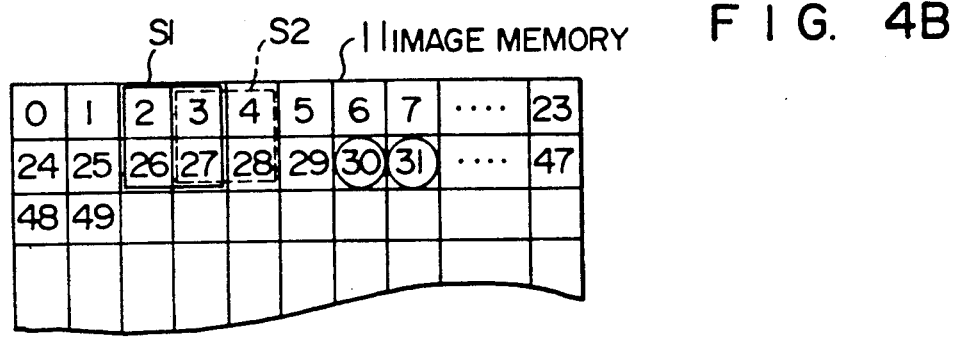

In the example of FIG. 4A, two local image extracting circuits 40A and 40B are used, and the wiring pattern in the local image reconstruction circuit 49 is formed so that the output of shift registers 44A and 42A included in the first image extracting circuit 40A and the outputs of shift registers 44B and 42B included in the second local image extracting circuit 40B are supplied to a local image processing circuit 50A, and the outputs of shift registers 43A and 41A included in the first local image extracting circuit 40A and the outputs of the shift registers 44B and 42B included in the second local image extracting circuit 40B are supplied to another local image processing circuit 50B. As shown in FIG. 4A, input lines 45A and 45B of the local image extracting circuits 40A an 40B alternately receive pixel data successively read out from the image memory 11. Thus, local regions S1 and S2 which deviate from each other on an original image by one pixel in the row direction, can be simultaneously extracted, and can be supplied to the local image processing circuits 50A and 50B in parallel. FIG. 4A shows the states of the local regions S1 and S2 at a time the twenty-eighth and twenty-ninth pixels are read out, and FIG. 4B shows the states of the local regions S1 and S2 at a time the thirtieth and thirty-first pixels are read out.

Figure 5:
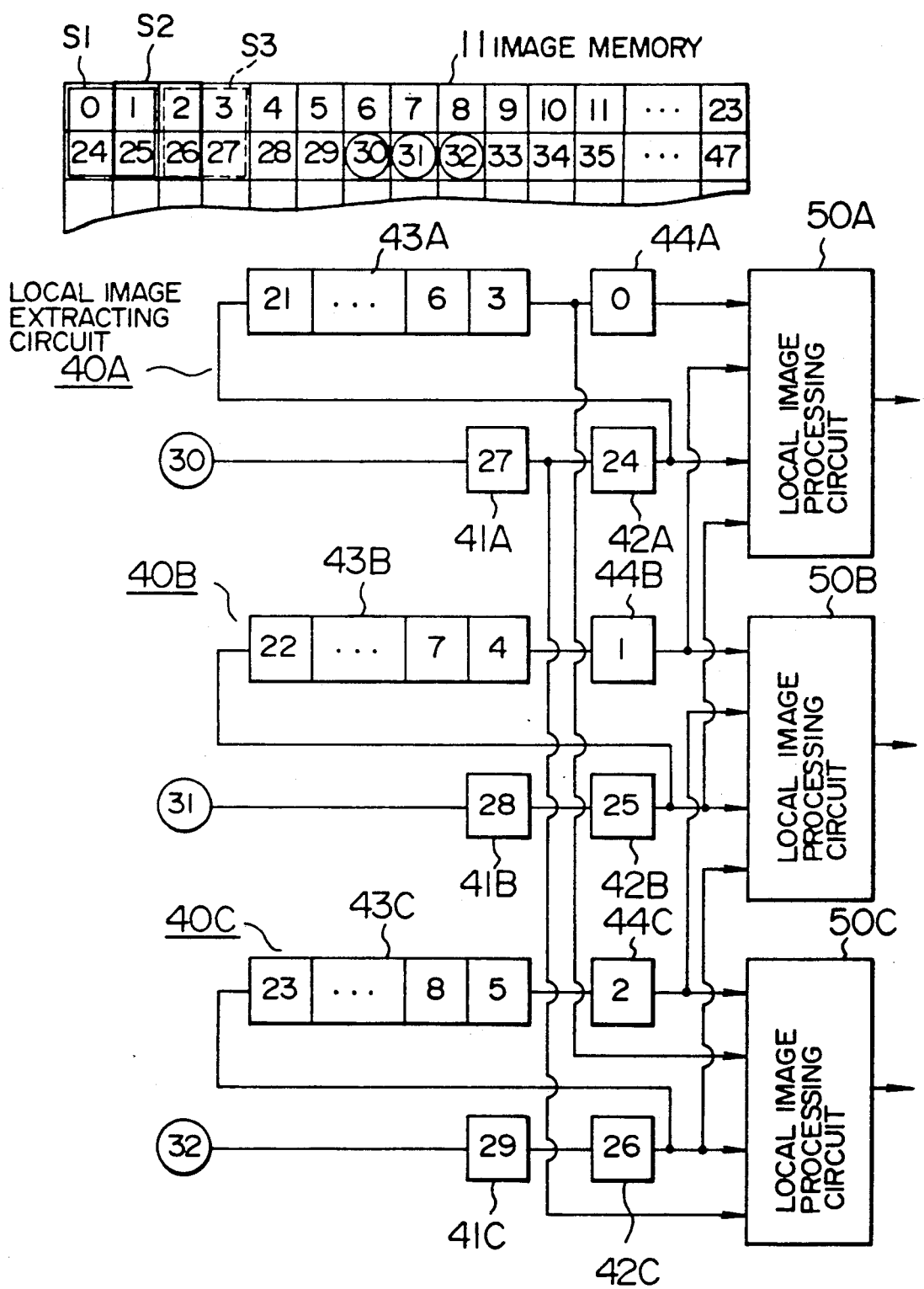
FIG. 5 is a diagram showing another example of a high-speed image processor according to the present invention.

FIG. 5 shows another example of an image processor according to the present invention, which example includes three local image extracting circuits 40A, 40B and 40C connected in parallel, and shows a positional relation among three local regions S1, S2 and S3 extracted by this example. It is needless to say that an image processor according to the present invention can include a desired number of parallel-connected local image extracting circuits.

Figure 6:
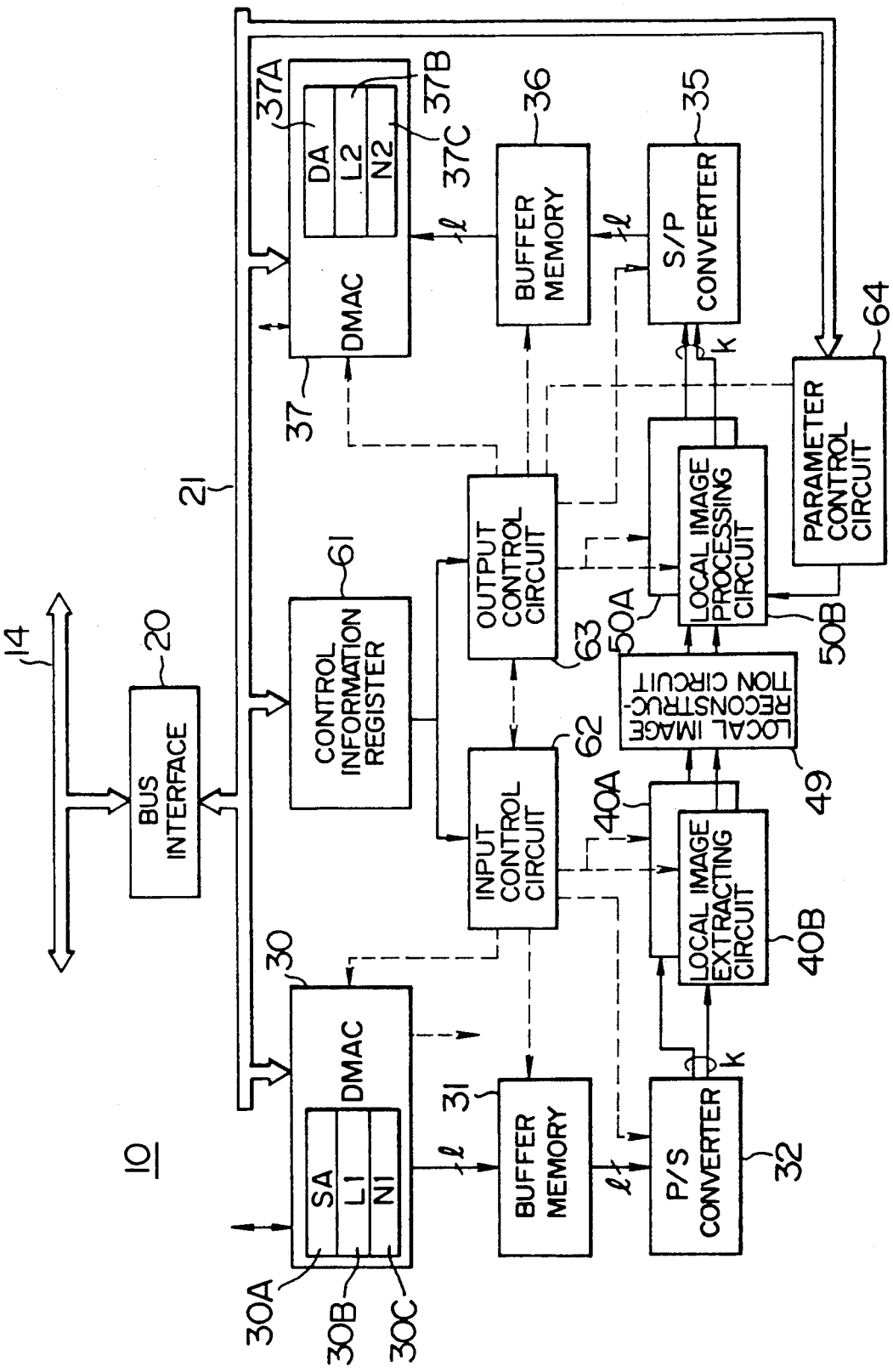
FIG. 6 is a block diagram showing the detailed construction of the image processor of FIG. 1.

FIG. 6 is a block diagram showing the circuit conjugation of the image processor 10 capable of processing local images in parallel. Referring to FIG. 6, the image processor 10 is connected to the common bus 14 through a bus interface 20. The image processor 10 has an inner bus 21 connected to the bus interface 20, and further includes a direct memory access controller (DMAC) 30 on the input side, a DMAC 37 on the output side, and a control information register 61. Each of these members 30, 37 and 61 is connected to the inner bus 21. The DMAC 30 fetches image data stored in the image memory 11, into a buffer memory 31 without receiving the aid of the CPU 1. Accordingly, a starting address SA for indicating that location in the image memory where the head of a data area to be read out is stored, a line length L1 for indicating the length of the data area in a transverse direction, and the number N1 of lines for indicating the length of the data area in the longitudinal direction are previously specified by the CPU 1, and stored in registers 30A, 30B and 30C, respectively. Like the DMAC 30, the DMAC 37 includes registers 37A to 37C, to indicate that area of the image memory where image data having been subjected to image processing is to be written. That is, a destination address DA for indicating that location in the image memory where the head of the image data is written, a line length L2, and the number N2 of lines, are written in the register 37A, 37B and 37C, respectively. The parameters DA, L2 and N2 are specified by the CPU 1.

Original image data stored in the buffer memory 31 is supplied to a parallel-series converter 32 in a block of l bits, and is outputted from the converter 32 bit by bit. The local image extracting circuits 40A and 40B alternately receive the image data from the converter 32. The pixel data which is delivered from the local image extracting circuits, is rearranged by the local image reconstruction circuit 49. Image data from the reconstruction circuit 49 is supplied to the local image processing circuits 50A and 50B in parallel. Pixel data which has completed a predetermined image processing by the local image processing circuits 50A and 50B is supplied to a serial-parallel converter 35 in order to convert it into parallel data. The parallel data is temporarily stored in a buffer memory 36, and then written in a predetermined area of the image memory 11 with the aid of the DMAC 37.

Reference numeral 62 in FIG. 6 designates an input control circuit for controlling the data transfer in an input portion made up of the DMAC 30, the buffer memory 31, the parallel-series converter 32 and the local image extracting circuits 40A and 40B. Further, reference numeral 63 designates an output control circuit for controlling the data transfer in an output portion made up of the local image processing circuits 50A and 50B, the series-parallel converter 35, the buffer memory 36 and the DMAC 37. These control circuits 62 and 63 operate according to control parameters which are set in a control information register 61 by the CPU 1. Each of the local image processing circuits 50A and 50B performs a predetermined, discriminating or recognition operation for respective successively-supplied local images, each made up of a plurality of pixels, and delivers one modified pixel to every local image. The contents of a processing which is carried out by each local image processing circuit, are specified by a parameter control circuit 64.

Figure 7:
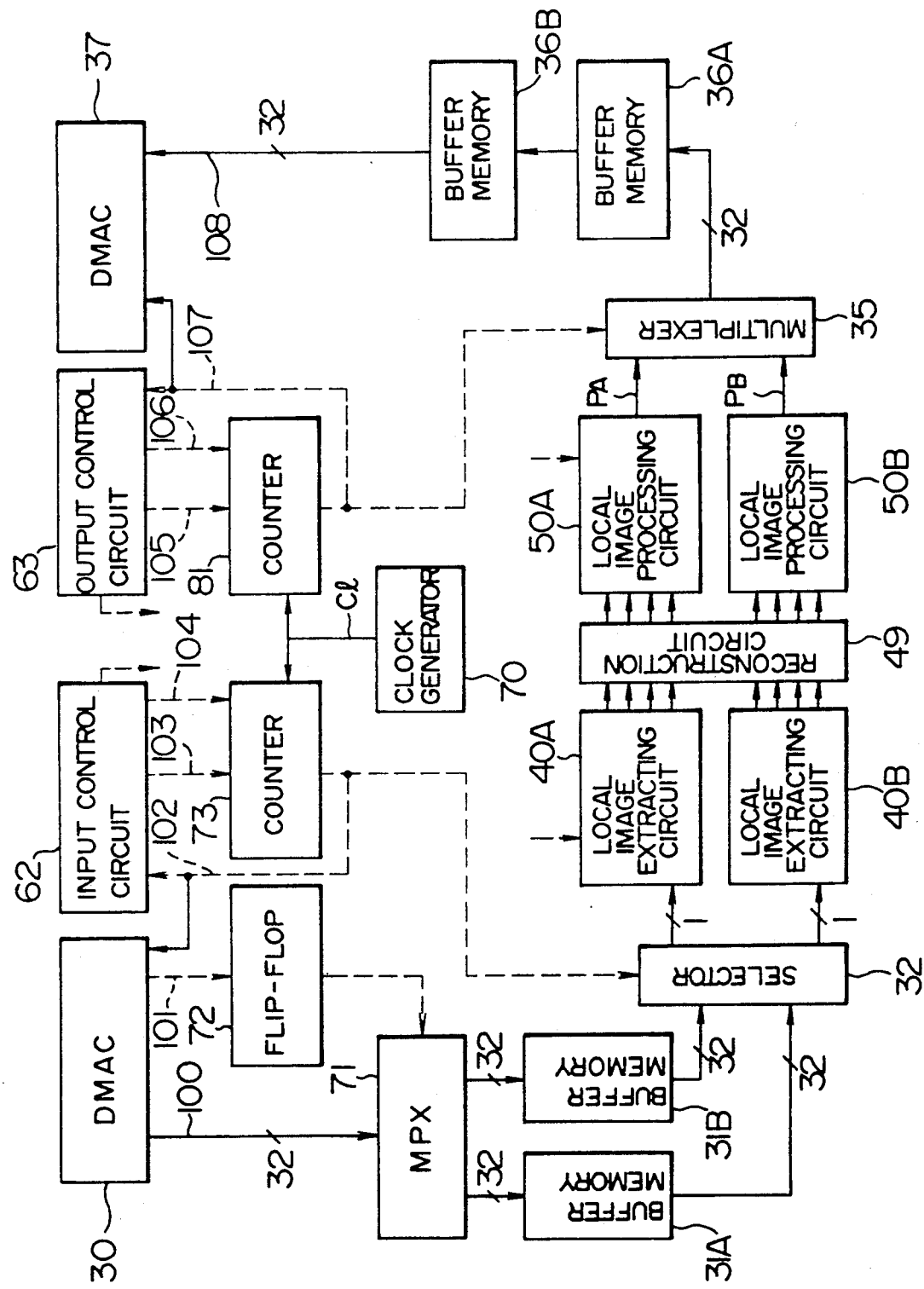
FIG. 7 is a block diagram showing a main part of the image processor of FIG. 6 in detail.

FIG. 7 shows the circuit configuration of the input and output portions of the image processor 10 in more detail. Referring to FIG. 7, image data is read out from the image memory 11 in a block of 32 bits, with the aid of the DMAC 30. The read-out image data is sent to buffer memories 31A and 31B through a data line 100 and a multiplexer (MPX) 71, to be stored in the buffer memories 31A and 31B in a predetermined order. A flip-flop circuit 72 controls the switch over of one output of the MPX 71 to the other output, and the state of the flip-flop circuit 72 is specified by a control signal 101 from the DMAC 30. The outputs of the buffer memories 31A and 31B are supplied to a selector 32. The selector 32 takes in the output of one of the buffer memories 31A and 31B in accordance with a counter value 102 which is indicated by a counter circuit 73 for counting clock pulses CL from a clock generator 70. Input data to the selector 32, is converted by the selector 32 into serial pixel data and is alternately supplied to the local image extracting circuits 40A and 40B. The operation of the counter circuit 73 is controlled by a reset signal 103 and an enable signal 104 each supplied from the input control circuit 62.

The counter circuit 73 counts clock pulses circularly up to an upper limit value which is equal to the number of pixels included in one row of image data, for example, up to 31. FIG. 8 shows an example of a relation among the counter value 102 of the counter Circuit 73, a buffer memory selected by the selector 32, and pixels inputted to the local image extracting circuits 40A and 40B. In this example, the buffer memory 31A is selected for a period when the counter value lies in a range from 0 to 15. In this period, the local image extracting circuits 40A and 40B alternately receive one pixel data each time the counter value 102 is updated. Further, the buffer memory 31B is selected for a period when the counter value lies in a range from 16 to 31. In this period, also, the local image extracting circuits 40A and 40B alternately receive one pixel data each time the counter value is updated. Thus, as has been explained with reference to FIG. 4A and 4B, it is possible to extract two local images in parallel. The DMAC 30 changes the state of the flip-flop circuit 72 in accordance with the counter value 102 so that after 32-bit data has been written in one of the buffer memories 31A and 31B, the next 32-bit data is written in the other buffer memory. Thus, original image data stored in the image memory 11 can be successively supplied to the buffer memories 31A and 31B.

Referring again to FIG. 7, image data processed by the local image processing circuits 50A and 50B are temporarily stored in a multiplexer 35, to be sent to a buffer memory 36A in a block of 32 bits. The multiplexer 35, as shown in FIG. 9, takes in pixel data from the local image processing circuits 50A and 50B in response to the update of a counter value 107 which is indicated by a counter circuit 81 for counting up the clock pulses CL, and converts the input data into a block of parallel data composed of 32 bits. The operation of the counter circuit 81 is controlled by a reset signal 105 and an enable signal 106 which are supplied from the output control circuit 63. Image data stored in the buffer memory 36A is transferred to another buffer memory 36B, and then written in the image memory 11 with the aid of the DMAC 37.

Figure 10:
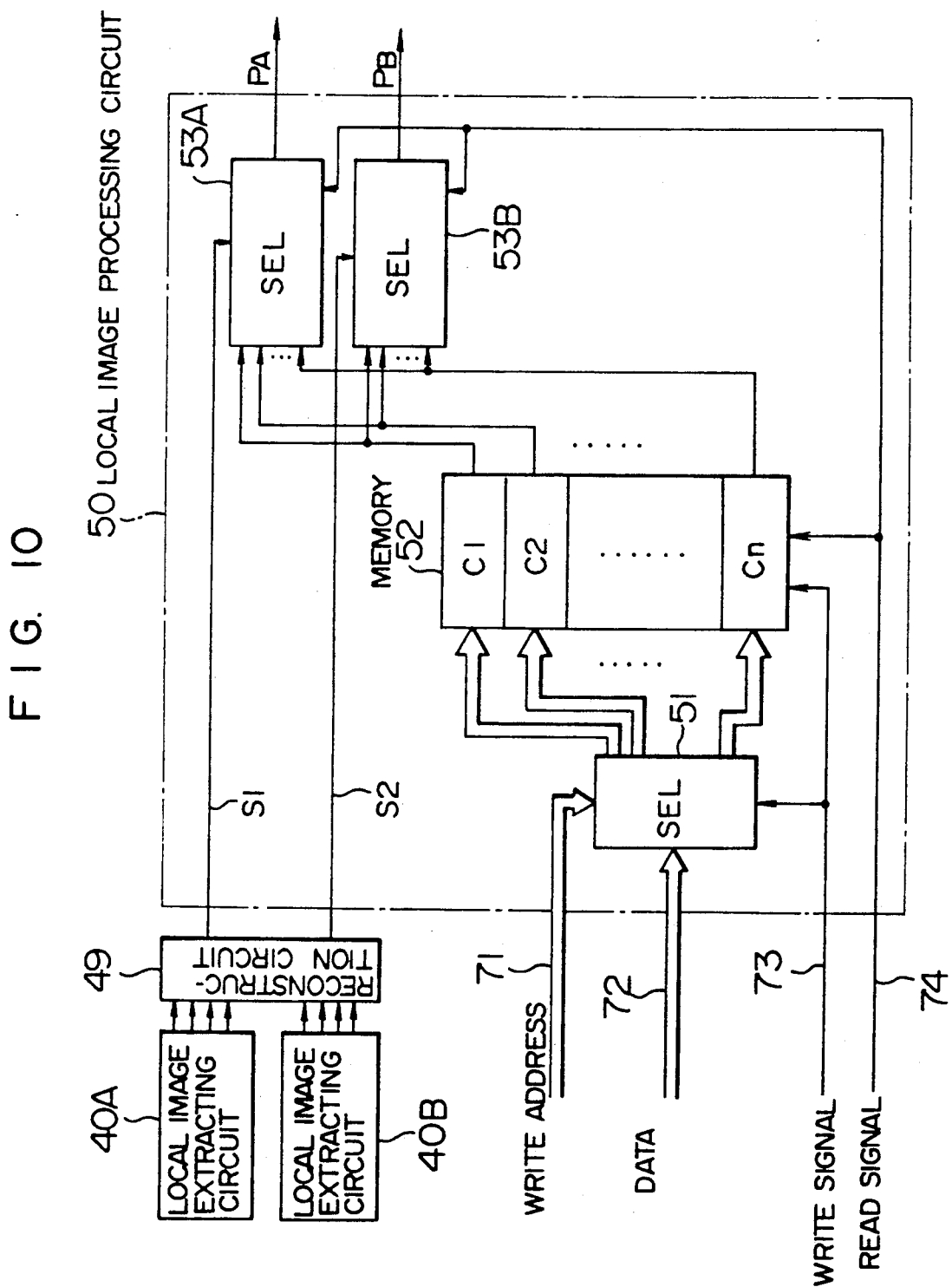
FIG. 10 is a block diagram showing an embodiment of a local image processing circuit.

The image processor of FIG. 7 includes two local image extracting circuits 40A and 40B and two local image processing circuits 50A and 50B, to process two local images in parallel. However, by increasing the number of local image processing systems to be operated in parallel and by allotting pixels of an original image to the local image processing systems in a predetermined order, the speed of image processing can be greatly increased FIG. 10 shows an embodiment of a local image processing circuit 50 according to the present invention. In the image processor of FIG. 7, two local image processing circuits are used for two local image extracting circuits. In the local image processing circuit 50 of FIG. 10, the states of m X n pixels of the local image S1 from the reconstruction circuit 49 are applied, as a select signal, to a selector 53A, and the states of m X n pixels of the local image S2 are applied, as a select signal, to another selector 53B. Image processing is to determine the state of an output pixel in accordance with the state of an input local image, that is, the combination of the states of m X n pixels included in the local image. Hence, processing results (that is, values of output pixel) $C_1$ to $C_n$ corresponding to various combinations of the states of m X n pixels are previously written in a memory 52, and the values $C_l$ to $C_n$ are applied to each of the selectors 53A and 53B. That one of the values $C_l$ to $C_n$ which is specified by an address corresponding to the combination of the states of m X n pixels of the local image S1, is selected by the selector 53A, to be delivered therefrom as modified pixel data Pa (namely, pixel data after image processing). Similarly, that one of the values $C_l$ to $C_n$ which is specified by an address corresponding to the state of the local images S2, is selected by the selector 53B, to be delivered therefrom as modified pixel data $P_B$ (namely, pixel data after image processing). Prior to image processing, the values $C_l$ to $C_n$ are written, as written data 72, in the memory 52 through a selector 51, while updating a write address 71. A write-in operation for the memory 52 is performed on the basis of a write signal 73, and a read-out operation for the memory 52 is performed on the basis of a read signal 74. The write address 71, the written data 72, the write signal 73 and the read signal 74 are supplied from the parameter control circuit 64 of FIG. 6.

I claim:
1. An image processing system comprising:
a plurality of local image extracting means each for extracting in parallel a plurality of pixel data, having a predetermined positional relation in a two-dimensional original image, from image data time-sequentially inputted to each local image extracting means;
local image reconstruction means connected to said plurality of local image extracting means for combining a plurality of extracted pixel data outputted in parallel from the plural local image extracting means so as to output in parallel pixel data representing a plurality of local images which, at the time of outputting, partially overlap each other on the original image by a predetermined amount;
a plurality of local image processing means, provided in a number corresponding to the number of local image extracting means, each for processing pixel data representing a respective one of the plurality of local images outputted from the local image reconstruction means, in parallel, to deliver a plurality of modified pixel data corresponding to the local images;
first memory means for storing therein two-dimensional image data to be processed;
second memory means for storing therein image data having been subjected to image processing;
first image data transfer means for supplying pixel that, which is read out form the image data stored in said first memory means in a predetermined scanning order, to the plural local image extracting means in a predetermined order so that each of said local image extracting means is connected in sequence to receive a different one of said pixel data in turn as the two-dimensional original image is scanned;

first control means for controlling data transfer operations in each local image extracting means and the first image data transfer means;

second image data transfer means for writing image data, which is delivered from the plural local image processing means, in the second memory means in a predetermined order; and second control means for controlling data transfer operations in the local image processing means and the second image data transfer means.

2. An image processing system according to claim 1, wherein the first image data transfer means includes first buffer memory means for temporarily storing image data, first direct memory access means for fetching image data stored in the first memory means into the first buffer memory means in accordance with preset parameters in such a manner that a predetermined number of pixels are written in the first buffer memory means at one time, and means connected to receive image data from the first buffer memory means for allotting the image data to said respective local image extracting means in such a manner that one pixel data is allotted to one local image extracting means at one time, and wherein the second image data transfer means includes delivering means receiving pixel data from the local image processing means for delivering a predetermined number of pixel data in parallel, second buffer memory means for temporarily storing therein pixel data delivered in parallel from said delivering means, and second direct memory access means for fetching pixel data stored in the second buffer memory means into the second memory means in accordance with preset parameters.

3. An image processing system according to claim 1, wherein the local image processing means includes a plurality of selector means corresponding to a plurality of local images which are outputted from the local image reconstruction means in parallel, respectively, data memory means for previously storing values of output pixels, each of which corresponds to one of input local images and is stored at an address expressed by the combination of the states of a plurality of pixels to be included in said one input local image, and means for conducting said values of output pixels stored in the data memory means to each selector means in parallel so that each selector means may select one of the values of said output pixels as one output pixel data, in accordance with the input local image supplied from the local image reconstruction means.

4. An image processing system according to claim 1, wherein the local image processing means includes a plurality of local image processing circuits operable in parallel, and each of the local image processing circuits is connected to receive one of a plurality of local images delivered from the local image reconstruction means, to deliver one pixel data obtained by processing the local image.

5. In an image processing system including means for displaying image data, an image memory for storing image data, an image processor for converting an original image stored in the image memory into a second image, and a control processor for controlling the supply of an image to the display means, the image processor comprising:

a plurality of local image extracting means each for extracting in parallel a plurality of pixel data, having a predetermined positional relation on a two-dimensional original image, from image data time-sequentially inputted to each local image extracting means;

local image reconstruction means connected to said plurality of local image extracting means for combining a plurality of extracted pixel data output in parallel from the plural local image extracting means so as to output in parallel pixel data representing a plurality of local images which, at the time of outputting, partially overlap each other on the original image by a predetermined amount;

a plurality of local image processing means, provided in a number corresponding to the number of local image extracting means, each for processing in parallel pixel data representing respective ones of said plurality of local images outputted from the local image reconstruction means, to deliver a plurality of modified pixel data corresponding to the local images;

first image data transfer means for supplying pixel data, which is read out from a first area of the image memory in a predetermined scanning order, to the plural local image extracting means in a predetermined order so that each of said local image extracting means is connected in sequence to receive a different one of said pixel data in turn as the two-dimensional original image is scanned;

first control means for controlling data transfer operations in each local image extracting means and the first image data transfer means;

second image data transfer means for writing image data, which is delivered from the plural local image processing means, in a second area of the image memory in a predetermined order; and second control means for controlling data transfer operations in the local image processing means and the second image data transfer means.

6. An image processing system according to claim 5, wherein the first image data transfer means includes first buffer memory means for temporarily storing image data, first direct memory access means for fetching image data stored in the first area of the image memory into the first buffer memory means in accordance with preset parameters in such a manner that a predetermined number of pixels are written in the first buffer memory means at one time, and means connected to receive image data from the first buffer memory means for allotting the image data to said respective local image extracting means in such a manner that one pixel data is allotted to one local image extracting means at one time, and wherein the second image data transfer means includes delivering mean receiving pixel data from the local image processing means for delivering a predetermined number of pixel data in parallel, second buffer memory means for temporarily storing therein pixel data delivered in parallel from said delivering means, and second direct memory access means for fetching pixel data stored in the second buffer memory means into the second area of the image memory in accordance with preset parameters.

7. An image processing system according to claim 5, wherein the local image processing means includes a plurality of selector means corresponding to a plurality of local images which are outputted from the local image reconstruction means in parallel, respectively, data memory means for previously storing values of output pixels, each of which corresponds to one of input local images and is stored at an address expressed by the combination of the states of a plurality of pixels to be included in said one input local image, and means for conducting said values of output pixels stored in the data memory means to each selector means in parallel so that each selector means may select one of the values of said output pixels as one output pixel data, in accordance with the input local image supplied from the local image reconstruction means.

8. An image processing system according to claim 5, wherein the local image processing means includes a plurality of local image processing circuits operable in parallel, and each of the local image processing circuits is connected to receive one of a plurality of local images delivered from the local image reconstruction means, to deliver one pixel data obtained by processing the local image.

9. An image processing system comprising:
a plurality of local image extracting circuits, each extracting in parallel a plurality of pixel data, having a predetermined positional relation in at least two lines of a two-dimensional original image, in response to pixel data of said original image time-sequentially inputted one pixel at a time in turn to different ones of said local image extracting circuits;
local image reconstruction means connected to said plurality of local image extracting circuits for combining a plurality of pixel data outputted in parallel from said plural local image extracting circuits so as to output in parallel a plurality of local images formed of contiguous pixel data occupying parts of at least two lines in said original image, which local images overlap each other in the original image by a predetermined amount at the time they are output in parallel; and
a plurality of local image processing circuits each for processing a respective one of said plurality of local images from the local image reconstruction means in parallel, to deliver a plurality of modified pixel data corresponding to the local images.

10. An image processing system according to claim 9, wherein said two-dimensional original image comprises m pixel data in each of n lines, and wherein each local image extracting circuit comprises shift register means for extracting in parallel at least one group of pixel data occupying corresponding positions in adjacent lines.

11. An image processing system according to claim 10, wherein said local image reconstruction means comprises a connection circuit for combining the extracted pixel data of respective sets of image extracting circuits to form respective local images.

12. An image processing system according to claim 10, further comprising memory means for storing image data representing said two-dimensional original image, and transfer means for scanning lines of image data in said memory means to read out one pixel data at time sequentially to a respective one of said image extracting circuits in turn.

13. An image processing system according to claim 10, wherein said two-dimensional original image comprises m pixel data in each of n lines, and wherein one of said local image extracting circuits comprise shift register means for extracting in parallel two groups of pixel data occupying non-contiguous positions in the line scanning direction, the pixel data of each respective group occupying corresponding positions in adjacent lines.

14. An image processing system according to claim 13, wherein said local image reconstruction means comprises a connection circuit for combining the extracted pixel data of respective sets of image extracting circuits to form respective local images.

15. An image processing system according to claim 13, further comprising memory means for storing image data representing said two-dimensional original image, and transfer means for scanning lines of image data in said memory means to read out one pixel data at a time sequentially to a respective one of said image extracting circuits in turn.

16. An image processing system according to claim 13, wherein each group of pixel data comprises two pixel data.

* * * * *